United States Patent [19]

Ranalli

[11] 4,254,568

[45] Mar. 10, 1981

[54] AERIAL NAVIGATION INSTRUMENTS

[76] Inventor: Alfonso Ranalli, 5409 William Flynn Hwy., Gibsonia, Pa. 15044

[21] Appl. No.: 83,765

[22] Filed: Oct. 11, 1979

[51] Int. Cl.³ .............................................. G09F 11/18
[52] U.S. Cl. ...................................................... 40/518
[58] Field of Search ............... 40/518, 10 A; 116/306

[56] References Cited

U.S. PATENT DOCUMENTS

| | | | |
|---|---|---|---|
| 1,312,445 | 8/1919 | Johnson | 40/518 |
| 1,923,113 | 8/1933 | Norvell | 40/518 X |
| 2,420,673 | 5/1947 | Monrad | 40/518 X |
| 2,482,818 | 9/1949 | Walters | 40/518 X |
| 2,631,390 | 3/1953 | Dorogoff | 40/518 |
| 2,792,647 | 5/1957 | Coss | 40/518 X |
| 3,232,685 | 2/1966 | Wilstein et al. | 40/546 X |
| 3,589,327 | 6/1971 | Jacobs | 116/306 |

FOREIGN PATENT DOCUMENTS

| | | | |
|---|---|---|---|
| 81676 | 8/1956 | Denmark | 40/518 |
| 604432 | 1/1926 | France | 40/518 |

*Primary Examiner*—John F. Pitrelli
*Attorney, Agent, or Firm*—Buell, Blenko, Ziesenheim & Beck

[57] ABSTRACT

An aerial navigation instrument is provided having a housing with a window on one side and an arcuate surface on the opposite side for resting on a user's leg, a continuous map of a desired route on rollers at each end of the window and a hinged plate means along one side of said housing adapted to pivot between a first position having a first face exposed generally in the plane of said window and a second position overlying said window with a second face exposed, means on said first face removably holding a writing surface, and means on said second face removably holding an outline of approach procedure and control for a selected landing area.

4 Claims, 3 Drawing Figures

AERIAL NAVIGATION INSTRUMENTS

This invention relates to aerial navigation instruments and particularly to a combination continuous map and local navigational map for pilots.

A very real problem faced by pilots, particularly when operating alone is that of having available a continuous map of the area over which he expects to travel during a day of flying, particularly where flying long distances and of having available, when needed, first a surface upon which to write notes and finally a local map of approach patterns and controls for any airport where a landing is to be made.

I have developed a navigational instrument which makes available a continuous aeronautical chart map for any flight together with an instantly available map of local approach patterns and procedures, commonly called an approach plate. This instrument eliminates the problem of searching for maps of adjacent areas, juggling a writing pad for noting instructions and the like on course and finally of getting a local approach pattern map and procedure sheet. This is particularly a problem for individual private pilots flying over long distances.

Various devices for handling maps and for aiding pilots and navigators or automobile drivers in dealing with them have been proposed. None of the proposals have been accepted in the field for many reasons. For example, Johnson U.S. Pat. No. 1,312,445 provides a map box and map in which a strip map is rolled from one roller to another. The map box is provided with a screw clamp for fastening onto the vehicle. Norvelle U.S. Pat. No. 1,923,113 provides a strip map with a protractor device movable over the map. A structure has arms which may be attached to the instrument board of an airplane. Neither of these structures is adapted to be attached to a pilot's knee or leg and neither is readily accessible, nor does it have the elements necessary to satisfy the requirements of a pilot as described above. Monrad U.S. Pat. No. 2,420,673 provides a map box which can be attached to a separate platform by means of a wire yoke or bail. The platform can, in turn, be attached to a pilot's thigh by straps. In an alternative embodiment, a bottom cover panel is pivoted on a yoke or bail so that it can be reversed, one side having a navigation computer and the other side a circular slide rule. In operating the device, the pilot can have available either the strip map or by raising the box and inverting it around the bail, the computer, but not both. The same is true in the modified form. Wilstein et al. U.S. Pat. No. 3,232,685 provides a knee board with a drawer which can be pulled out for storing charts or forms. Danish U.S. Pat. No. 81,676 and French Pat. No. 804,432 shows forms of strip maps but nothing which is useful for a pilot. The structure of the present invention is the first which makes readily available a device which solves all of the needs of a pilot during flight.

In a preferred embodiment of my invention I provide a housing having an opening or window therein, a pair of rolls, one at each end of said window, a continuous map of the route of travel on said rolls, means for manually rotating said rolls to move the map from one roll to the other in front of said window and a hinged plate hinged along one side of said housing and adapted to pivot between a first position having a first face exposed generally alongside and in the plane of said window and a second position overlying said window with a second face exposed, means on said first face removably holding a writing surface, and means on said second face removably holding an outline of approach procedure and approach control for the destination airport. The housing is provided on the portion opposite the window with an arcuate surface adapted to rest on the knee and upper leg of a user and having leg engaging means for holding the housing in position. The leg engaging means is preferably a strap; however, it may be a U-shaped spring clip or clips.

In the foregoing general description I have set out certain objects, purposes and advantages of my invention. Other objects, purposes and advantages of this invention will be apparent from a consideration of the following description and the accompanying drawings in which.

Figure 1:
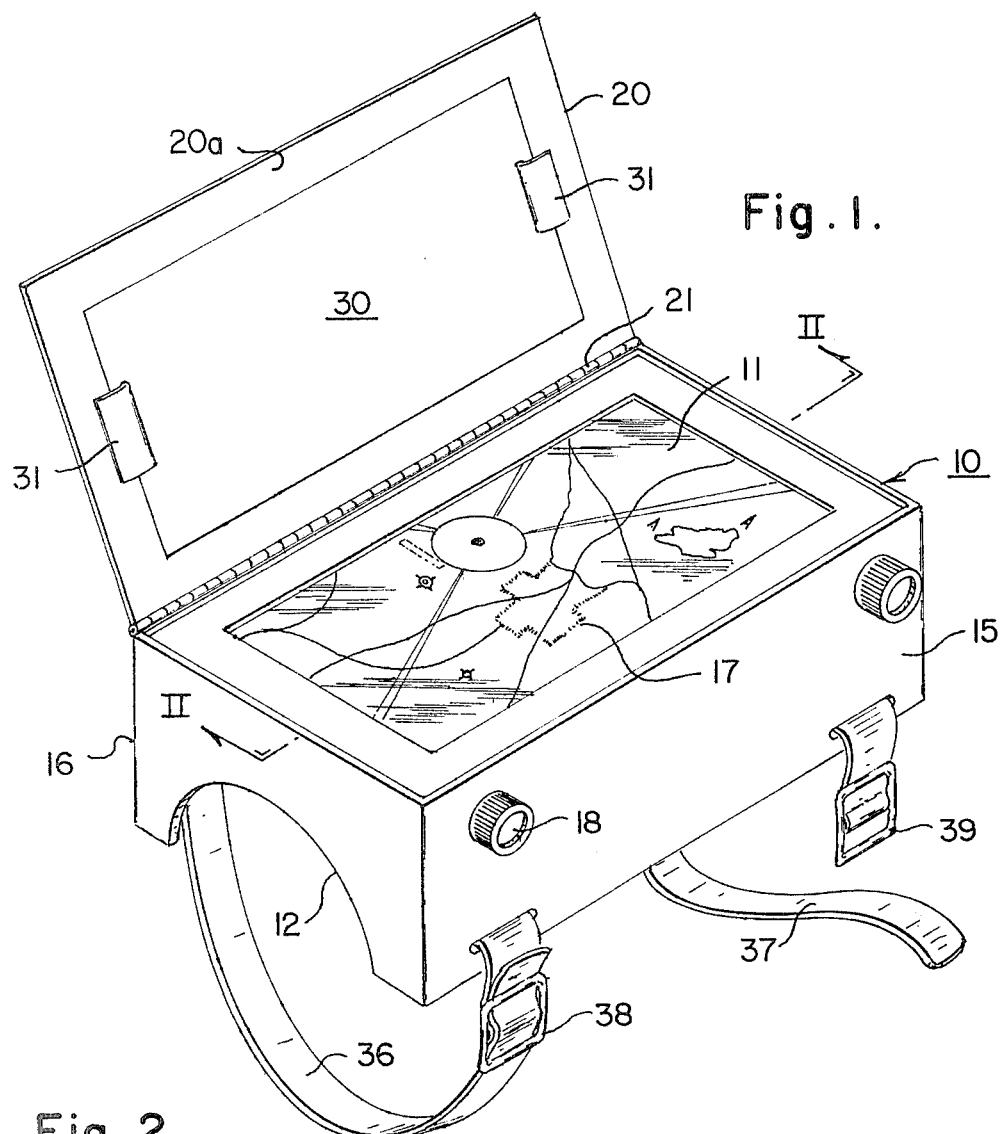
FIG. 1 is an isometric view of a navigational aid according to my invention partly open.
Figure 2:
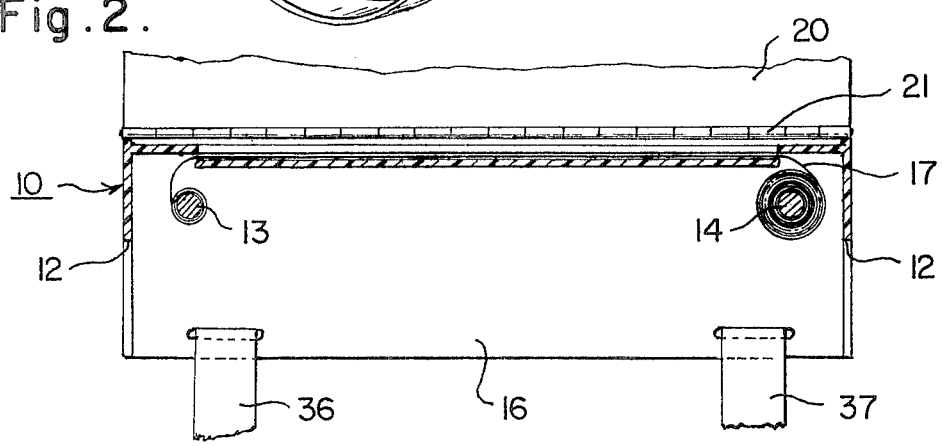
FIG. 2 is a section on the line II—II of FIG. 1.
Figure 3:
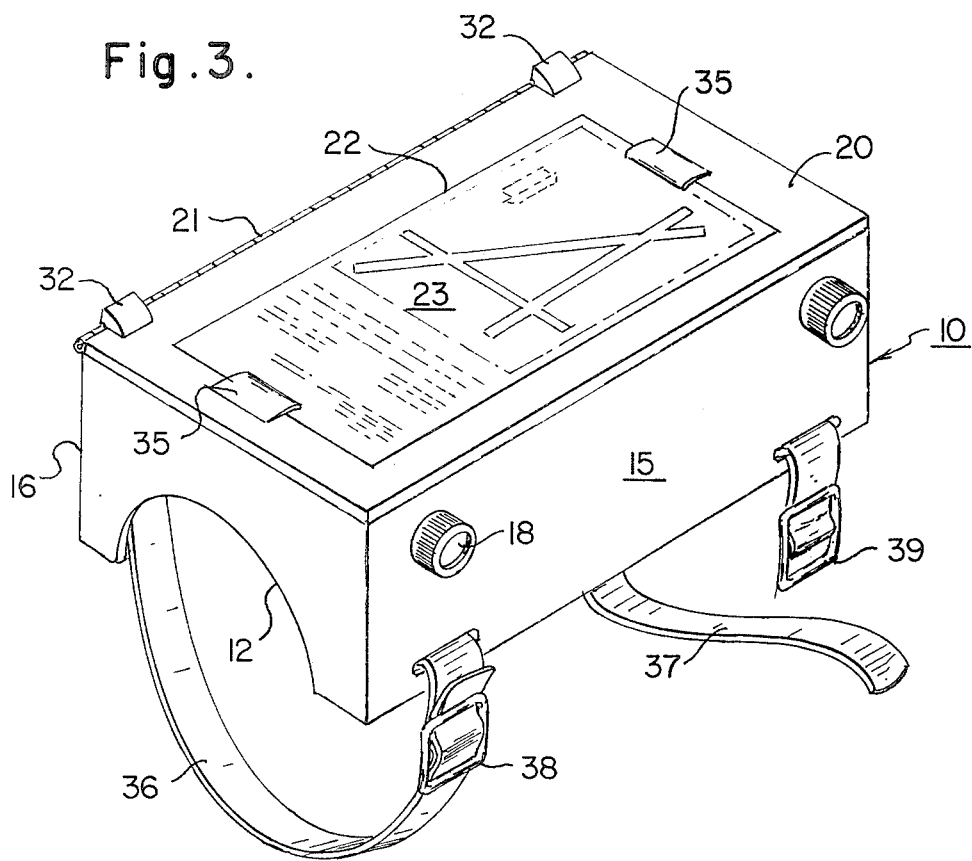
FIG. 3 is an isometric view of the navigational aid of FIG. 1 in the closed position.

Referring to the drawings, I have illustrated a housing 10 having a transparent window 11 on the top surface and a spaced bottom surface 12 curved to fit the leg of a user. A pair of rolls or spools 13 and 14 are journalled in the side walls 15 and 16 of the housing. A continuous aeronautical chart 17 covering a standard planned flight route from one city to another is placed on rolls 13 and 14 with the starting end engaged on one, e.g. 13 and the balance of the roll on the other, e.g. 14. As the flight progresses, the aeronautical chart is rolled, for example, from roll 14 onto roll 13 by the user rotating knob 18 on the end of roll 13. Upon reaching the approach area of the airport, plate 20 hinged by hinge 21 along one side of housing 10 is flipped over window 11. The plate 20 is provided with a window area 22 removably and interchangeably carrying an approach procedure and approach control guide 13 for the airport (an approach plate) at which a landing is to be made.

As the flight progresses the pilot can make notes on sheet 30 held on surface 20a on the plate 20 on the opposite side from window 20 by spring clips 31. During the flight, plate 30 is generally alongside and in the same plane as window 17 and is held against further rotation by stops 32. This holds plate 20 against falling below the plane of window 17 but permits plate 20 to be freely rotated around hinge 21 to a position over window 17 so that it does not interfere with the pilots other leg and permits the approach guide 23 to be readily positioned for landing in clips 35.

Straps 36 and 37 on housing 10 may be passed around under the pilots leg and through buckles 38 and 39 to hold housing 10 firmly thereon.

This provides in readily accessible form, all the map detail and approach control and procedure guides necessary for a long flight as well as eliminates the need to continually pick up and discard maps as the flight progresses and for a final search for the proper control and approach pattern guide sheet.

In the foregoing specification I have set out certain preferred embodiments and practices of my invention; however, it will be understood that this invention may be otherwise embodied with the scope of the following claims.

I claim:

1. An aerial navigation instrument comprising a housing having a window therein, a pair of rollers in said housing, one at each end of the window, a continuous aeronautical chart of a desired route of travel on said rollers, means for rotating said rollers whereby said aeronautical chart is moved from one roller to the other in front of said window and a plate means hinged along one side of said housing and adapted to pivot between a first position generally in the plane of said window in the housing and alongside thereof, stop means on one of said plate means and housing engaging between said plate means and housing to hold said plate means in said first position alongside said window to form a jointly substantially planar surface and a second position overlying said window, said plate having a second window portion exposed in said second position and carrying an outline of approach procedure and control for a destination airport, said hinged plate means having a first face exposed in said first position removably holding a writing surface and a second face carrying said second window portion, and an arcuate surface on said housing opposite said window adapted to rest on the leg of a user and having leg engaging means thereon.

2. An aerial navigation instrument as claimed in claim 1 wherein the leg engaging means is a strap.

3. An aerial navigation instrument as claimed in claim 1 wherein the leg engaging means is a U-shaped spring clip.

4. An aerial navigation instrument as claimed in claim 1 wherein the means for rotating the rollers is a knurled knob on the end of each roller.